United States Patent
Higuchi et al.

(10) Patent No.: US 6,927,844 B2
(45) Date of Patent: Aug. 9, 2005

(54) FINGERPRINT INPUT APPARATUS

(75) Inventors: Teruyuki Higuchi, Tokyo (JP); Takeo Sugawara, Hamamatsu (JP)

(73) Assignees: NEC Corporation, Tokyo (JP); Hamamatsu Photonics K.K., Shizuoka (JP)

( * ) Notice: Subject to any disclaimer, the term of this patent is extended or adjusted under 35 U.S.C. 154(b) by 319 days.

(21) Appl. No.: 10/282,073

(22) Filed: Oct. 29, 2002

(65) Prior Publication Data

US 2003/0118219 A1 Jun. 26, 2003

(30) Foreign Application Priority Data

Oct. 30, 2001 (JP) ........................................ 2001-331859

(51) Int. Cl.⁷ .............................................. G06K 9/74
(52) U.S. Cl. ........................................................ 356/71
(58) Field of Search ........................... 356/71; 382/124, 382/127; 250/556

(56) References Cited

U.S. PATENT DOCUMENTS

| | | | | |
|---|---|---|---|---|
| 4,932,776 | A | * 6/1990 | Dowling et al. | 356/71 |
| 5,426,296 | A | 6/1995 | Shikai et al. | |
| 5,446,290 | A | * 8/1995 | Fujieda et al. | 250/556 |
| 5,822,445 | A | * 10/1998 | Wong | 382/127 |
| 6,292,576 | B1 | * 9/2001 | Brownlee | 382/124 |
| 2003/0215117 | A1 | * 11/2003 | Hata | 382/124 |

FOREIGN PATENT DOCUMENTS

| | | |
|---|---|---|
| CN | 2201059 | 6/1995 |
| CN | 1221161 A | 6/1999 |
| DE | 37 07 808 A1 | 9/1988 |
| EP | 0 749 023 A1 | 12/1996 |
| JP | H06-300930 A | 10/1994 |
| JP | H09-069161 A | 3/1997 |
| JP | H09-134419 A | 5/1997 |
| JP | 2996295 B2 | 10/1999 |
| JP | H11-272852 A | 10/1999 |
| JP | 3045629 B2 | 3/2000 |
| JP | 2000-217803 A | 8/2000 |
| JP | 2001-119008 A | 4/2001 |
| JP | 2001-143056 A | 5/2001 |
| WO | 1998-0010859 A | 4/1998 |
| WO | WO 00/70547 A1 | 11/2000 |
| WO | WO 01/69520 A2 | 9/2001 |

OTHER PUBLICATIONS

Dr. Ulrich Stetter et al., "Zugangskontrolle Bei Biometrischen Zugangssystemen" Siemens Technik Report, vol. 2, No. 3, Apr. 1999, pp. 9–11.

* cited by examiner

*Primary Examiner*—Michael P. Stafira
(74) *Attorney, Agent, or Firm*—Sughrue Mion, PLLC

(57) ABSTRACT

A fingerprint input apparatus includes a light source 2 for emitting light and a fiber optic plate 3 having a finger contact surface with which a finger 1 is brought into contact in order to pick up a fingerprint image of the finger 1. The light from the light source 2 is at first introduced into an inside of the finger 1, is scattered within the inside of the finger 1, and comes out of the finger through the surface of the finger 1 as outgoing light. By the use of the outgoing light, the fingerprint image is formed. The light source 2 is disposed so that the light from the light source 2 enters into a substantial center of a part of the finger 1 including a first joint on a palm side and that the light source 2 is contacted with the finger 1.

13 Claims, 18 Drawing Sheets

WITH LED UNDER FIRST JOINT (THIS INVENTION)

WITHOUT LED UNDER FIRST JOINT

FINGERPRINT INPUT APPARATUS

BACKGROUND OF THE INVENTION

This invention relates to a fingerprint input apparatus and, in particular, to an optical fingerprint input apparatus for acquiring a fingerprint image by the use of a two-dimensional image sensor.

As an optical fingerprint input apparatus using a two-dimensional image sensor, an optical reflective fingerprint input apparatus and an optical transmissive fingerprint input apparatus are known. Recently, attention is directed to the optical transmissive fingerprint input apparatus. In the optical transmissive fingerprint input apparatus, light at first enters into an inside of a finger, is scattered within the inside of the finger, and comes out of the finger through a surface of the finger as outgoing light By the use of the outgoing light, a fingerprint image is formed. In the optical transmissive fingerprint input apparatus, fingerprint identification or collation is more stably and reliably carried out as the light quantity of the outgoing light coming out from the skin of the finger is more uniform over an object surface of the finger for which the fingerprint image is to be acquired. If the light quantity is nonuniform, a greater amount of calculation is required for correction. In this event, it is difficult to reduce the price, the size, and the power consumption of the fingerprint input apparatus. Therefore, it is desired to achieve uniformity in light quantity. To this end, the light is irradiated from an opposite side of the finger opposite to the object surface as a measured surface.

On the other hand, in order to meet the recent demand for reduction in size and thickness of the fingerprint input apparatus, use is made of methods illustrated in FIGS. 1 through 3. Specifically, in the method illustrated in FIG. 1, light from a light source is irradiated to an end of the finger. In the method illustrated in FIGS. 2A and 2B, light from LEDs (light emitting diodes) as a light source is irradiated to lateral sides of the finger. In the method illustrated in FIG. 3, light from LEDs is irradiated to the measured surface of the finger.

In these methods, however, the light quantity in the measured surface is nonuniform. Correction of the nonuniformity in light quantity inevitably requires an increased amount of calculation.

Referring to FIG. 4, description will be made of another method which has been used also. In this method, a fiber optic plate 100 comprising a bundle of a plurality of optical fibers, i.e., an optical fiber bundle, is used in order to acquire a fingerprint image. Each of the optical fibers has a fiber axis inclined at a specific inclination angle with respect to a normal line to a finger contact surface of the fiber optic plate 100. This method often adopts an optical transmissive system as a light irradiation system. Predominantly, the light is irradiated by an illuminating unit located at the opposite side opposite to the measured surface of the finger (FIG. 4) or by the light source located at the lateral sides of the finger (FIGS. 2A and 2B). Rarely, use is made of the method of irradiating the light to the end of the finger as mentioned above in conjunction with FIG. 1.

The method of using the fiber optic plate is also applicable to the optical reflective fingerprint input apparatus. As illustrated in FIG. 5, the light from the light source is irradiated from the lateral side or obliquely from the lateral side of the finger to the optical fiber bundle of the fiber optic plate, guided to the measured surface of the finger, diffusely reflected at fingerprint valleys, and thereafter guided to the optical fiber bundle.

As illustrated in FIG. 6, still another existing method will be described. A light transmitting ring 110 is used to position the finger. The light emitted from the LEDs is irradiated from a lower side or obliquely from the lower side of the ring 110 and injected through the ring 110 into the finger placed on the fiber optic plate 100. The light transmitted through the finger is guided through the optical fiber bundle of the fiber optic plate 100 to a two-dimensional sensor, in this case, the light is guided through the ring 110 as an optical guide to the finger. Thus, the light is irradiated to the finger from the lateral sides thereof.

Referring to FIGS. 7A and 7B, an existing fingerprint input apparatus includes a fiber optic plate 100' which comprises a combination of illuminating optical fibers for guiding light from LEDs to the finger and measuring optical fibers for guiding light transmitted through the finger to a two-dimensional sensor. As seen from FIG. 7B, the illuminating optical fibers are inclined with respect to the measuring optical fibers.

In a fingerprint input apparatuses using a two-dimensional sensor and having a thin profile (without using a lens or a prism), the two-dimensional sensor is influenced by electrostatic charges accumulated in the finger. If the electrostatic charges have very strong electric energy, the two-dimensional sensor may be broken. In order to avoid the influence by the electrostatic charges, a transparent electrode layer such as tin oxide is formed on the surface of the sensor and grounded in case where the sensor is an optical sensor.

In case where the sensor is a static capacitive sensor, an antistatic electrode can not be applied to its surface. As illustrated in FIGS. 8A and 8B, the static capacitive sensor depicted by a reference numeral 17 is provided with an electroconductive mask 16, relatively wide, formed around a sensing or measuring surface thereof and grounded.

In recent years, attention is directed to the optical fingerprint input apparatus in view of stability and resolution. In addition, following the widespread use of mobile or cellular telephones and the enlargement of the range of use of the mobile telephones beyond telephone conversation, there is an increasing demand for security, in particular, personal authentication. Therefore, it is requested to provide a fingerprint input apparatus which is stably and reliably operable and reduced in size, thickness, power consumption, and price. From the above-mentioned background, the fingerprint input apparatus using the fiber optic plate and the two-dimensional sensor has predominantly been used.

In the fingerprint input apparatus of the type, a fingerprint focusing portion is reduced in thickness. For a light irradiating structure, however, a satisfiable technique is not yet established because of trade-off between the reduction of nonuniformity in light quantity in the measured surface and the reduction in size and thickness. In order to minimize the nonuniformity in light quantity in the measured surface, the best approach is to irradiate the light from the opposite side of the finger opposite to the measured surface, i.e., from the side of a nail. However, this approach requires a space greater than the thickness of the finger and can not be applied to an ultraminiaturized apparatus, such as the mobile telephone, which will be widespread more and more. Thus, from the limitation of the space, it is impossible to use any other method than the light irradiation from the lateral side of the finger or from the side of the measured surface of the finger. However, the light irradiation from the lateral side or from the side of the measured surface of the finger is disadvantageous in the following respects.

For example, consideration will be made of the method described in conjunction with FIG. 6. In this method, the light is irradiated obliquely from the lower side of the finger through the light transmitting ring 110 which serves as a finger position guide. Specifically, the light is emitted from the light source (LEDs) to the air and thereafter enters into the ring 110 as the finger position guide. With this structure, an optical loss is great and, in order to compensate the optical loss, the light source must be increased in brightness. This results in an increase in power consumption. On the other hand, in order to compensate an insufficient light quantity without increasing the power consumption, the light must be irradiated from the close proximity of the measured surface through the ring 110 as the finger position guide. This increases the nonuniformity in light quantity in the measured surface.

In case where the light is irradiated to the end of the finger as illustrated in FIG. 1, the light from the light source often enters directly into the optical fibers facing the measured surface. In addition, the light quantity received at a part of the finger near its base is insufficient.

In the methods described in conjunction with FIGS. 7A and 7B and FIG. 5, the light is irradiated directly to the measured surface of the finger.

In FIGS. 7A and 7B, the illuminating optical fibers for light irradiation are arranged adjacent to the measuring optical fibers for fingerprint measurement and inclined with respect to the measuring optical fibers. The light from the LEDs is irradiated through the illuminating optical fibers to the finger. In this case, the resolution is degraded because of inclusion of the illuminating optical fibers. In addition, the fiber optic plate must be prepared by a combination of the illuminating optical fibers and the measuring optical fibers different in extending direction from each other. This results in an increase in production cost. Therefore, this method does not meet the demand for a low price.

In FIG. 5, the light is irradiated to the finger obliquely from the lower side of the optical fiber bundle of the fiber optic plate. In this case, the illuminating optical fibers are not required. The light is irradiated to the measured surface of the finger through the measuring fibers (including cladding portions). The light scattered in an air layer at the fingerprint valley is measured as a bright part. Thus, this method is basically a measurement of an optical reflective type. On the other hand, external light (upon measurement during the daytime) performs a behavior of an optical transmissive type. Therefore, canceling points are present and result in unstable measurement.

As a technique of a small-sized fingerprint input apparatus presently known, reference will be made to the invention set forth in claim 3 of Japanese Patent No. 3045629. An operation principle similar to the invention is already known. The operation principle is based on the fact that, when the light is directly irradiated to a finger as an object and comes out therefrom after scattered in the finger, the fractions of light coming from a recessed part (valley) and a protruding part (ridge) of the fingerprint are incident into the optical fibers of the fiber optic plate to different extents. Specifically, the fraction of light coming from the protruding part is incident to the optical fiber at a small loss over an aperture angle of the optical fiber because an end of the protruding part is contacted with an end face of the optical fiber. On the other hand, the fraction of light coming from the recessed part enters into the air layer at the valley of the fingerprint, The fraction of light passing through the air layer is reflected at the finger contact surface of the fiber optic plate at a reflectance which is greater as an incident angle is greater with respect to the normal line to the finger contact surface. Therefore, if the optical fiber axis is inclined to an angle at which the reflectance is great and if the fiber has a small numerical aperture, the fraction of light from the air layer hardly enters into the optical fiber. For the protruding part, reflection at a boundary surface is little so that the influence is little. Therefore, the rate of incidence into the optical fiber is different between the fraction of light coming from the protruding part and the fraction of light coming from the recessed part. This brings about a high contrast. The above-mentioned concept is disclosed in U.S. Pat. No. 4,932,776 already published. On the other hand, according to claim 3 in Japanese patent No. 3045629, a critical angle is present in case where the light coming from the air layer at the valley of the fingerprint enters into the optical fiber bundle, and the axis of the optical fiber must be inclined so that the critical angle is beyond the numerical aperture of the optical fiber, i.e., beyond the range of a total reflection critical angle. However, in case where the light is incident from the air layer to the optical fiber having a refractive index greater than that of the air, the critical angle is not present in principle and the reflectance is simply increased with an increase in angle. As shown in FIG. 9, the incident angle $\theta_1$ is equal to 85° assuming that the reflectance of 50% corresponds to the critical angle. Therefore, the axis of the optical fiber must be inclined to 85°. In this event, the end face of the optical fiber has an extremely long elliptical shape. The resolution is considerably different in a long axis direction and in a short axis direction. This results in a disadvantage that the resolution in the long axis direction is degraded. Taking the above into consideration, it is necessary in practical applications to seek an optimum condition on the basis of the concept disclosed in U.S. Pat. No. 4,932,776.

In the method of using the fiber optic plate, strong electric energy of the electrostatic charges accumulated in the finger affects the operation of an LSI (Large Scale Integrated Circuit) used as an image sensor. Therefore, the electrostatic charges must be reduced. In the existing technique described above, the measuring surface of the sensor is provided with the transparent electrode layer of a thin film, such as an ITO (Indium Tin Oxide) film. However, the thin film has a large electric resistance so that a large quantity of electrostatic charges can not instantaneously be discharged. In addition, discharge of the electrostatic charges may deteriorate the thin film itself. Furthermore, the thin film is worn as a result of repeated contact with the finger for a long period of time so that the ability of discharging electrostatic charges is degraded. As described in conjunction with FIGS. 8A and 8B, the static capacitive sensor 17 is provided with the electroconductive mask 16, relatively wide, formed around the measuring surface as an antistatic mask because the antistatic electrode such as the ITO film can not be applied to the surface. However, the surface of the static capacitive sensor 17 can not be protected by a relatively thick insulation film or the like. Therefore, if the finger at first comes into close proximity to the sensor before it approaches the antistatic mask, the electrostatic charges are discharged to the sensor to break the sensor.

SUMMARY OF THE INVENTION

It is therefore an object of this invention to provide an optical transmissive fingerprint input apparatus which is reduced in size by arranging a light source so that light from the light source is incident to a substantial center of a part of a finger including a first joint or articulation on a palm side and that the light source is adapted to be brought into contact with the finger.

Fingerprint input apparatuses according to this invention are as follows:

(1) A fingerprint input apparatus comprising a light source for emitting light and a plate having a finger contact surface with which a finger is brought into contact in order to pick up a fingerprint image of the finger, the fingerprint image being obtained by introducing the light from the light source into an inside of the finger to scatter the light within the inside of the finger, and collecting the light coming out of the finger through a surface of the finger to form the fingerprint image, wherein:

the light source is arranged so that the light from the light source enters into a substantial center of a part of the finger which part includes a first joint on a palm side of the finger and that the light source is adapted to be brought into contact with the finger.

(2) A fingerprint input apparatus as set forth in paragraph (1), wherein:

the part including the first joint on the palm side of the finger is a region between a line nearer to a fingertip of the finger than the first joint by 10 mm and a different line farther from the fingertip than the first joint by 10 mm on the palm side of the finger.

(3) A fingerprint input apparatus as set forth in paragraph (1), wherein:

the plate is a fiber optic plate comprising a bundle of a plurality of optical fibers.

(4) A fingerprint input apparatus as set forth in paragraph (3), wherein:

each of the optical fibers of the fiber optic plate has a fiber axis inclined towards a base of the finger at a predetermined inclination angle with respect to a normal line to the finger contact surface of the plate, the inclination angle falling within a range between 45° and 60° with respect to the normal line.

(5) A fingerprint input apparatus as set forth in paragraph (3), wherein:

the fiber optic plate has a peripheral end face surrounded by an electroconductive substance which is grounded.

(6) A fingerprint input apparatus as set forth in paragraph (5), wherein:

the electroconductive substance is shaped to climb up onto an end portion of the finger contact surface of the fiber optic plate.

(7) A fingerprint input apparatus as set forth in paragraph (5), wherein:

the electroconductive substance is a light-shielding substance.

(8) A fingerprint input apparatus as set forth in paragraph (1), wherein:

the finger contact surface of the fiber optic plate has a protruding portion which serves to position the finger and which has a shape such that a fingertip of the finger is surrounded by the protruding portion except the part including the first joint, the protruding portion having a section such that one side faced to the finger extends along the finger.

(9) A fingerprint input apparatus as set forth in paragraph (8), further comprising:

an additional light source located in the protruding portion, the protruding portion transmitting light from the additional light source.

(10) A fingerprint input apparatus as set forth in paragraph (9), wherein:

the protruding portion has a slant surface which is defined by the one side of the section faced to the finger and which is adapted to be fitted to the finger, the slant surface having a light shielding portion formed in a first half region near the base of the finger, the light from the additional light source being irradiated towards the finger from a second half region of the slant surface near the fingertip of the finger.

(11) A fingerprint input apparatus as set forth in paragraph (1), wherein:

the light source is adapted to emit near infrared light having a wavelength between 820 and 980 nm.

(12) A fingerprint input apparatus as set forth in paragraph (1), wherein:

the light source comprises a light emitting element chip for emitting the light and a package made of a light transmitting plastic material and enveloping the light emitting element chip;

the light transmitting plastic material having a refractive index not greater than 1.8 which is a refractive index of a skin of the finger.

(13) A fingerprint input apparatus as set forth in paragraph (1), wherein:

the plate is provided with a guiding light source located at its periphery for emitting light to guide the finger to a proper position.

Figure 1:
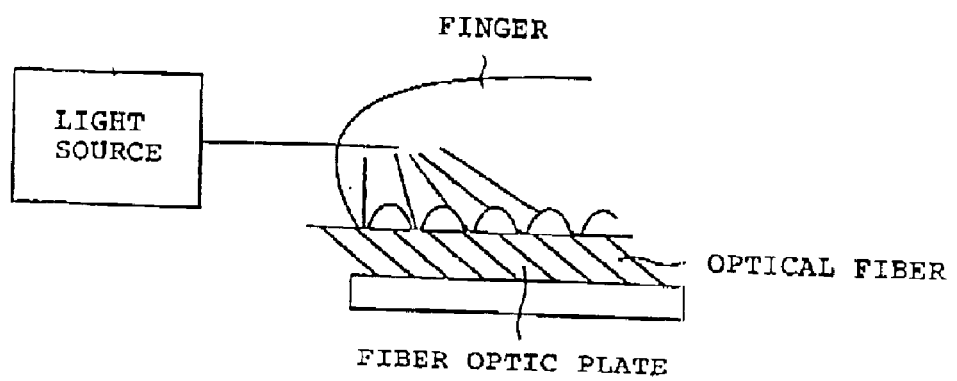
FIG. 1 is a view for describing an existing technique of irradiating light to an end of a finger.

DESCRIPTION OF THE PREFERRED EMBODIMENTS:

Now, description will be made of several preferred embodiments of this invention with reference to the drawing.

Figure 10:
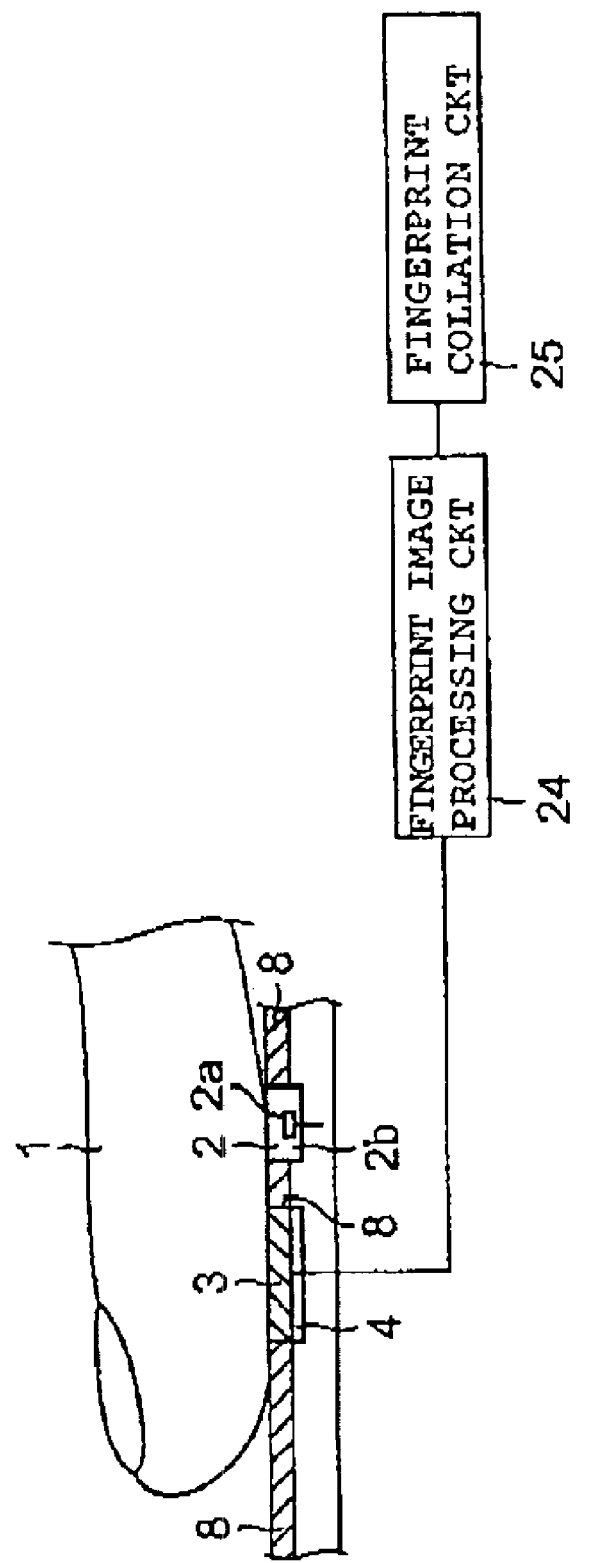
FIG. 10 is a schematic view of a fingerprint input apparatus according to a first embodiment of this invention.

At first referring to FIG. 10, a fingerprint input apparatus according to a first embodiment of this invention is of an optical transmissive type and comprises a fiber optic plate 3 having a finger contact surface with which a finger 1 is brought into contact in order to pick up a fingerprint image of the finger 1, and a light source 2 for emitting light. The light emitted from the light source 2 is at first introduced into an inside of the finger 1, is scattered within the inside of the finger 1, and comes out of the finger 1 through the surface of the finger 1 as outgoing light. By the use of the outgoing light, the fingerprint image is formed. The light source 2 is arranged so that the light from the light source 2 enters into a substantial center of a part of the finger 1 including a first joint on a palm side and that the light source 2 is adapted to be brought into contact with the finger 1.

Preferably, the part of the finger 1 including the first joint on the palm side is a region within 10 mm above and below the first joint of the finger 1 on the palm side. That is, the part including the first joint on the palm side of the finger is a region between a line nearer to a fingertip of the finger than the first joint by 10 mm and a different line farther from the fingertip than the first joint by 10 mm on the palm side of the finger.

The fiber optic plate 3 comprises a bundle of a plurality of optical fibers. The light from the light source 2 is at first introduced into the finger 1, is scattered in the finger 1, and comes out from the surface of the finger 1 as the outgoing light. The outgoing light is guided through the optical fibers of the fiber optic plate 3 to a two-dimensional sensor 4. Supplied with the outgoing light, the two-dimensional image sensor 4 forms the fingerprint image.

The fingerprint input apparatus has a measuring surface (or a finger contact surface) provided with a light shielding portion 8 formed in an area except the light source 2 and the fiber optic plate 3.

The fingerprint image formed by the two-dimensional image sensor 4 is sent to a fingerprint image processing circuit 24. Supplied with the fingerprint image, the fingerprint image processing circuit 24 carries out predetermined image processing upon the fingerprint image to produce an image processing output signal. The fingerprint image processing circuit 24 supplies the image processing output signal to a fingerprint collation circuit 25. The fingerprint collation circuit 25 carries out fingerprint collation.

As described above, this invention relies upon a basic technique in which the light source 2 is arranged so that the light from the light source 2 enters into the substantial center of the part of the finger 1 including the first joint on the palm side and that the light source 2 is adapted to be brought into contact with the finger 1.

In the existing technique, the light irradiation is carried out as follows. The light emitted from the light source at first enters into the air and is thereafter irradiated to the finger. Alternatively, the light emitted from the light source passes through the air, enters into the finger position guide or the like, comes out from the finger guide, and then enters into the finger. Therefore, 50 to 80% of the light quantity is lost. In order to compensate the loss, the light must be introduced into the finger from the close proximity of a measured portion. In the measured portion, the light quantity is considerably different between a center area and a peripheral area close to a position where the light is introduced. This inhibits stable and reliable measurement.

In this invention, an intermediate part at an intermediate position between the first joint of the finger 1 and the fingertip is used as the measured portion. The near-infrared light source 2 is located at a position corresponding to the first joint and is spaced at an appropriate distance from the measured portion. While the light advances over the above-mentioned distance, the light is scattered within the finger 1 so that the nonuniformity in light quantity is reduced. In comparison, in case where the light is irradiated from the lateral sides of the finger 1, the light quantity is nonuniform and insufficient in the center area so that the fingerprint image is dark in the center area. In this embodiment, by arranging the one light source 2 at the position corresponding to the first joint, the light from the light source 2 not only irradiates a part of a measured surface near the first joint but also compensates the light quantity in the center area, which tends to be dark as mentioned above, of the measured surface up to the fingertip. Thus, the contrast is increased as a whole and the nonuniformity in light quantity is suppressed.

Figure 11:
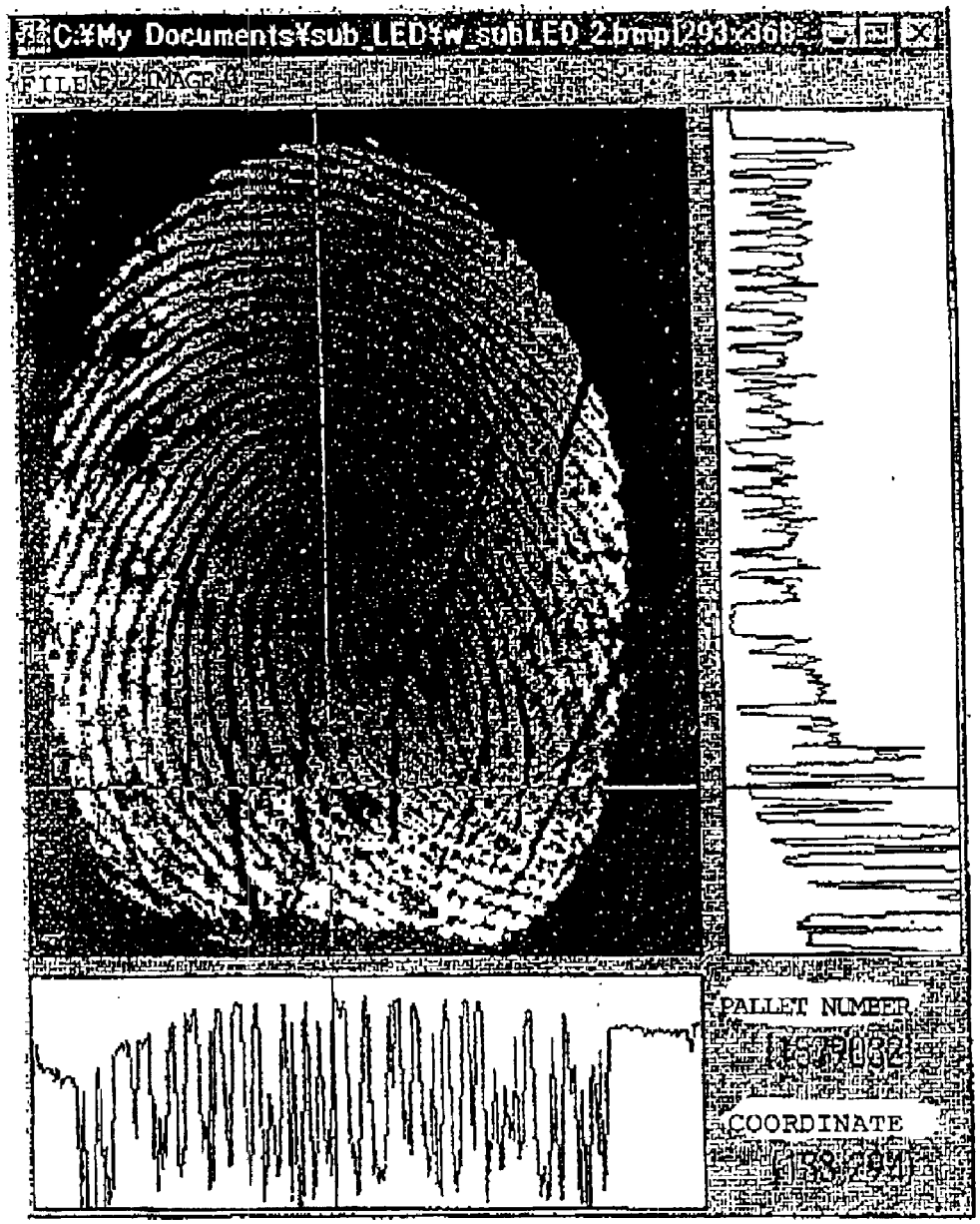
FIG. 11 is a view showing a brightness distribution of a fingerprint image read by a two-dimensional sensor of the fingerprint input apparatus in FIG. 10 (with an LED below a first joint)

The above-mentioned effect is seen from the result of actual measurement illustrated in FIG. 11 (brightness distribution read by the two-dimensional image sensor 4 in FIG. 10). Furthermore, in this invention, the finger 1 is brought into press contact with the light source 2. Therefore, the light does not pass through the air so that the optical loss at the boundary between the finger 1 and the light source 2 is reduced. In other words, because the optical loss is small, the light source 2 driven by low power is sufficient. Specifically, by arranging the light source 2 at the position near the first joint, it is possible to achieve both the lighting effect sufficient to form the fingerprint image and the equalizing effect of suppressing the nonuniformity in light quantity. By the basic technique described above, the disadvantage of the existing technique can be considerably suppressed or reduced. However, by combining the following techniques, the performance and the stability during actual use can be improved further.

Figure 12:
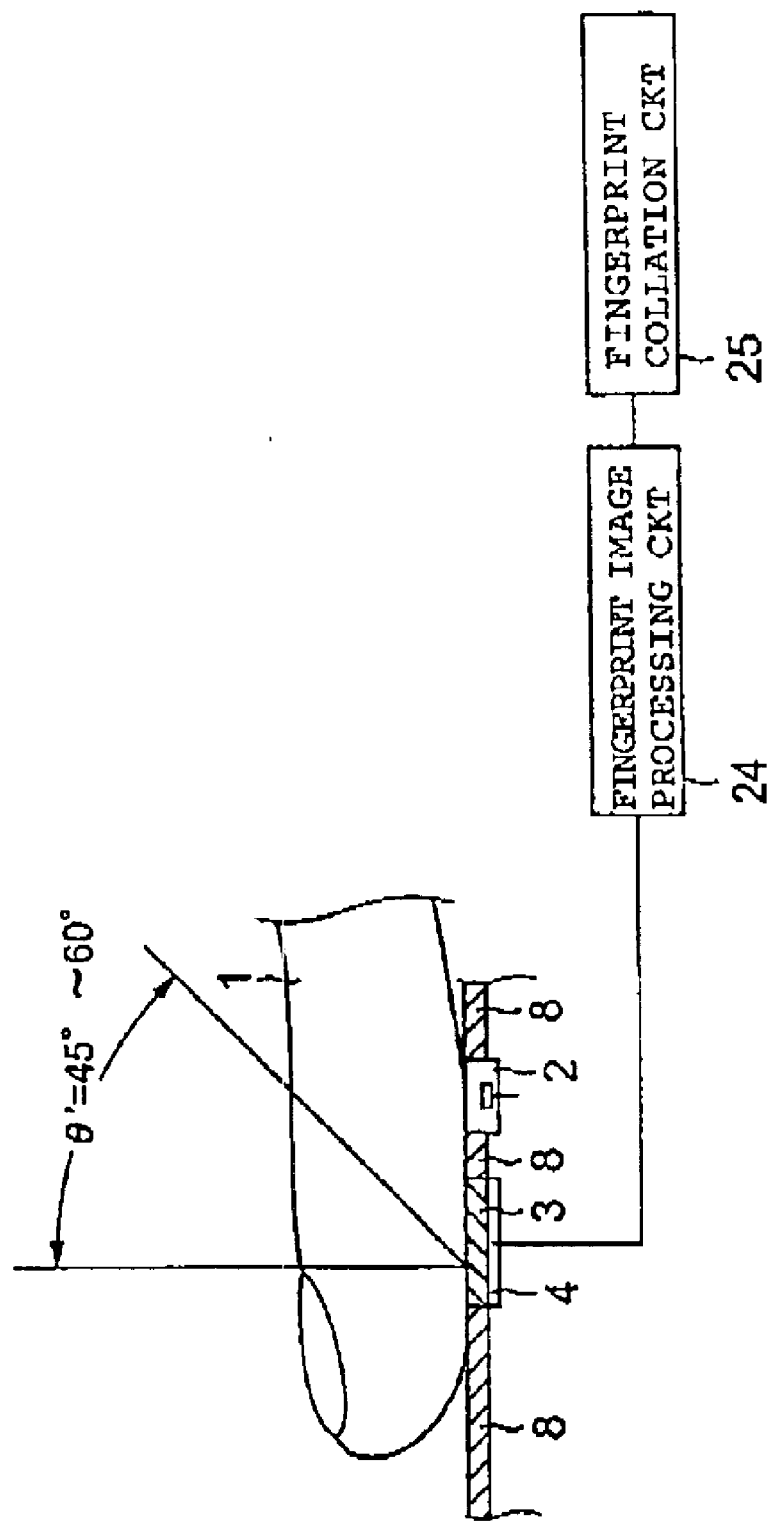
FIG. 12 is a schematic view of a fingerprint input apparatus according to a second embodiment of this invention.

(1) Referring to FIG. 12, a fingerprint input apparatus according to a second embodiment of this invention will be described. Each of the optical fibers of the fiber optic plate 3 has a fiber axis inclined towards the base of the finger 1 at an inclination angle θ' (45° <θ'<60°) with respect to a normal line to the finger contact surface of the fiber optic plate 3.

With this structure, the nonuniformity in light quantity is reduced and the contrast is improved. Therefore, even under inferior measuring conditions, stable measurement can be carried out.

Figure 13:
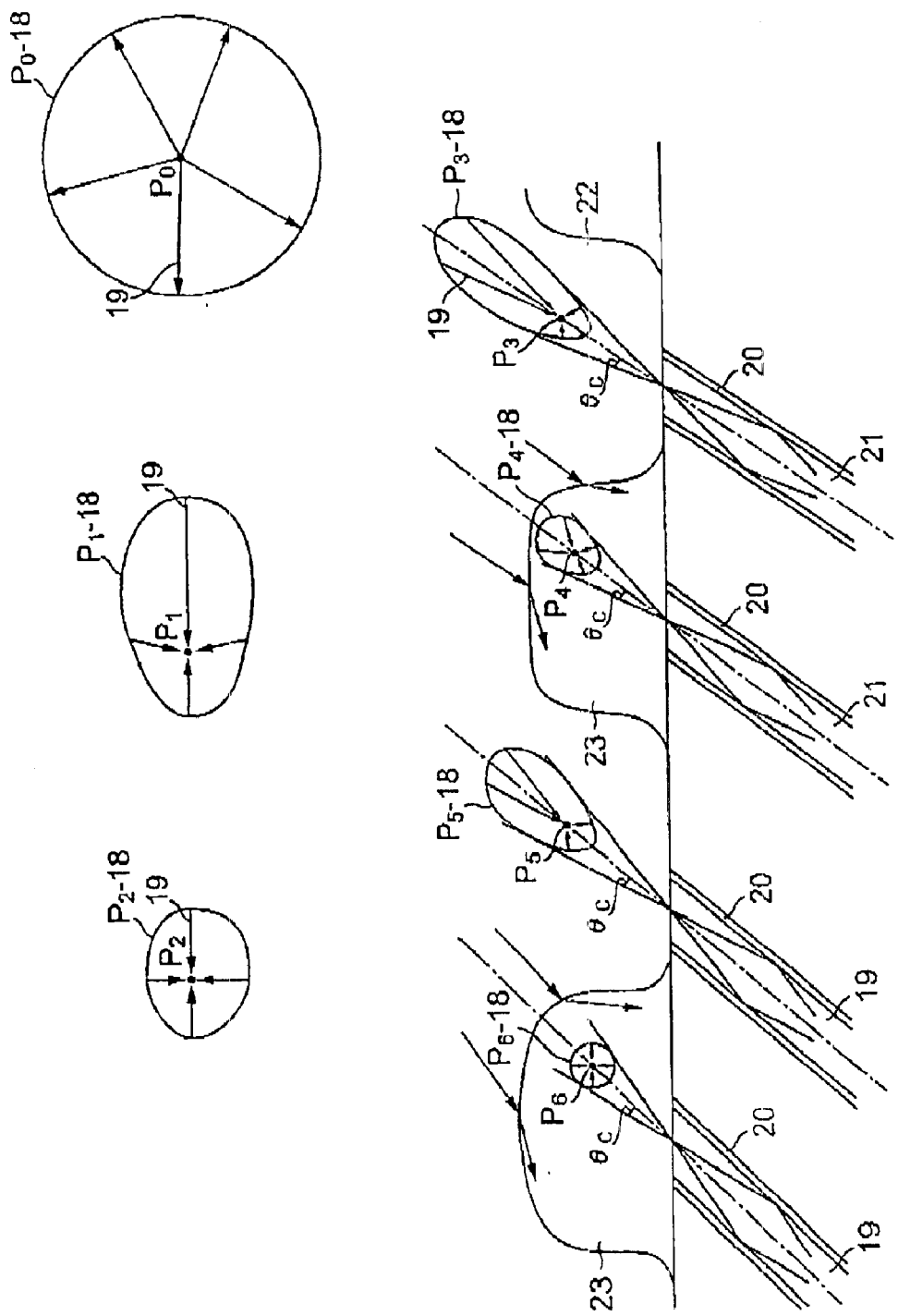
FIG. 13 is a view for describing the distribution of light directions in the finger.

Referring to FIG. 13, the description will be made of a mechanism of the above-mentioned effect. In FIG. 13, each of arrows 19 represents the intensity and the direction of the light incident to each point in the finger or emitted from a point acting as the light source. The reference numeral 20 represents a cladding of the optical fiber, 21, a core of the optical fiber, 22, a fingerprint protrusion (ridge), 23, a fingerprint recess (valley), $P_0$, a position deemed as a two-dimensional light source, $P_1$, a position near the two-dimensional light source, $P_2$, a position far from the two-dimensional light source, $P_3$, a position in the fingerprint protrusion near the two-dimensional light source, $P_4$, a position in the fingerprint recess near the two-dimensional light source, $P_5$, a position in the fingerprint protrusion far from the two-dimensional light source, $P_6$, a position in the fingerprint recess far from the two-dimensional light source, $P_0$-18 to $P_6$-18, light direction distributions at the positions of $P_0$ to $P_6$, $\theta_c$, a total reflection propagation critical angle in the optical fiber.

Figure 9:
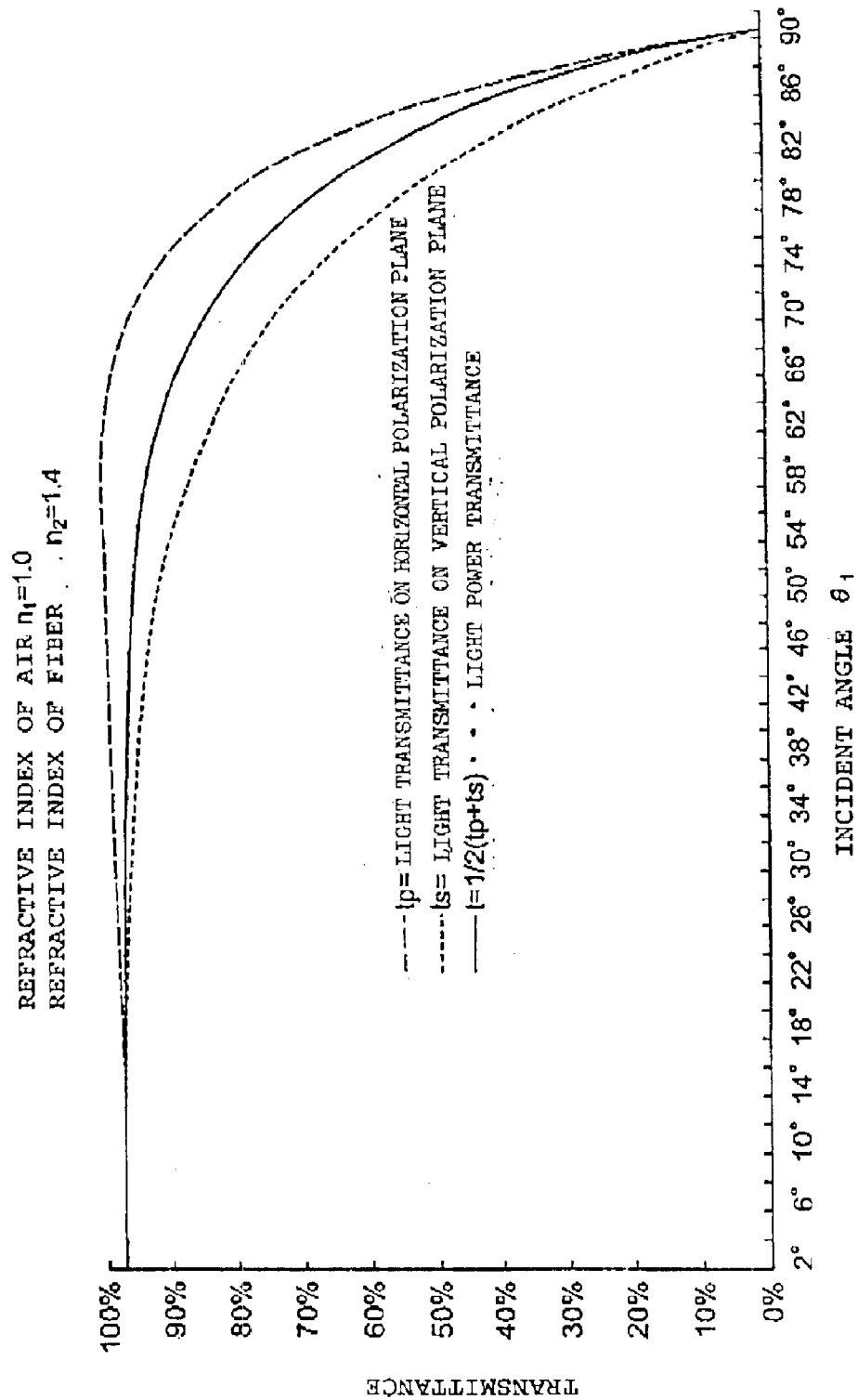
FIG. 9 is a view showing the relationship between a light transmittance and an incident angle when light coming from a fingerprint valley (air) enters into an optical fiber.

The finger has a nature adapted to scattering of light. Therefore, the light direction distribution in the finger is approximate to a circle as shown in FIG. 13. Specifically, the direction of the light incident to a given point in FIG. 13 will be considered. It is assumed that $P_0$ is a center position of the two-dimensional light source formed by reflection at a finger bone or the like. Then, the light from the position $P_0$ of the two-dimensional light source has strong distribution. However, the light is also incident from other directions so that the light direction distribution has an elliptical shape ($P_1$-18 and $P_2$-18 in FIG. 13). At the fingerprint protrusion also, the above-mentioned tendency is observed. However, due to the shade of the valley or the like, the direction is slightly changed ($P_3$-18 and $P_5$-18 in FIG. 13). If the fiber axis of the optical fiber is oriented in that direction, a greater quantity of light is introduced within the total reflection critical angle ($\theta_c$ in FIG. 13) of the optical fiber so that a bright portion becomes more bright. On the other hand, the light entering into the air layer at the fingerprint valley is remarkably scattered because of large refraction at the boundary between the finger and the air and reflection between the valley and the finger. Therefore, the light direction distribution further approaches a circle ($P_4$-18 and $P_6$-18 in FIG. 13). In addition, reflection is caused at the boundary between an end face of the optical fiber and the air. Therefore, the light incident to the optical fiber is further reduced. Due to the above-mentioned reasons, the light in the valley does not have a significant correlation with the inclination of the optical fiber axis. Furthermore, no critical angle is present in the reflection. Therefore, the reflection is simply increased if the inclination angle (incident angle $\theta_1$) is equal to or greater than 80°, as shown in FIG. 9. Therefore, the direction and the angle of inclination of the optical fiber is related to the position of the light source and have optimum values. As an experimental fact, it has been found optimum to use the fiber optic plate in which the optical fiber axis is inclined at an angle of 45° to 60° with respect to the normal line, and to orient the optical fiber towards the light source located in the vicinity of the first joint.

Figure 14A:
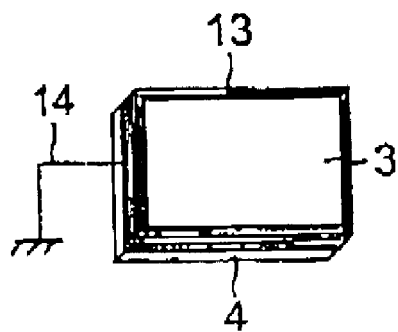
FIGS. 14A and 14B are a perspective view and a sectional view of a part of a fingerprint input apparatus according to a third embodiment of this invention.
Figure 14B:
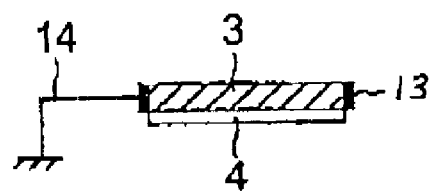

(2) Referring to FIGS. 14A and 14B, a fingerprint input apparatus according to a third embodiment of this invention will be described. The fiber optic plate 3 has a peripheral end face surrounded by an electroconductive substance 13. The electroconductive substance 13 is grounded.

Figure 15A:
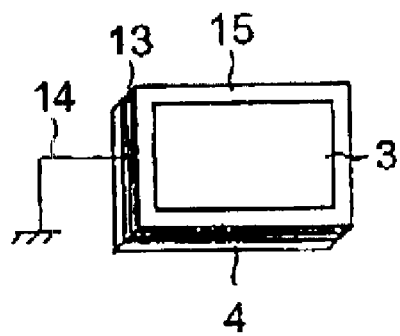
FIGS. 15A and 15B are a perspective view and a sectional view of a part of a fingerprint input apparatus according to a fourth embodiment of this invention.
Figure 15B:
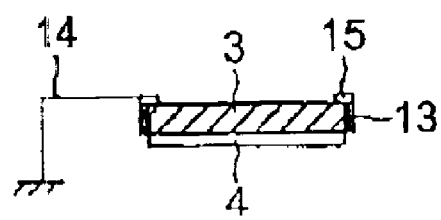

Referring to FIGS. 15A and 15B, a fingerprint input apparatus according to a fourth embodiment of this invention will be described. The electroconductive substance 13 climbs up on an end portion 15 of the finger contact surface of the fiber optic plate 3.

The electroconductive substance 13 is a light-shielding substance.

In the existing thin-profile fingerprint input apparatus, the influence upon the characteristics of the two-dimensional image sensor 4 or the destruction of the sensor 4 due to electrostatic charges accumulated in the finger is not negligible although the sensor is of an optical type. Therefore, an effective antistatic arrangement is desired. In this invention, the peripheral end face of the fiber optic plate 3 is surrounded by the electroconductive substance 13, such as metal, having both the electric conductivity and the light shielding ability. A part of the electroconductive substance 13 may climb up onto the end portion 15 of the finger contact surface. By grounding the electroconductive substance 3, the electrostatic charges accumulated in the finger is effectively escaped. In addition, the electroconductive substance 13 serves to avoid undesired entry of external disturbance light through a side surface of the fiber optic plate 3. Thus, the electroconductive substance 3 has double effects.

(3) Referring to FIG. 16, a fingerprint input apparatus according to a fifth embodiment will be described. The finger contact surface of the fiber optic plate 3 is provided with a protruding portion 5 adapted to surround the fingertip of the finger 1 except the above-mentioned part including the first joint in order to position the finger 1. The protruding portion 5 has a section such that one side faced to the finger 1 extends along the finger 1.

Figure 17:
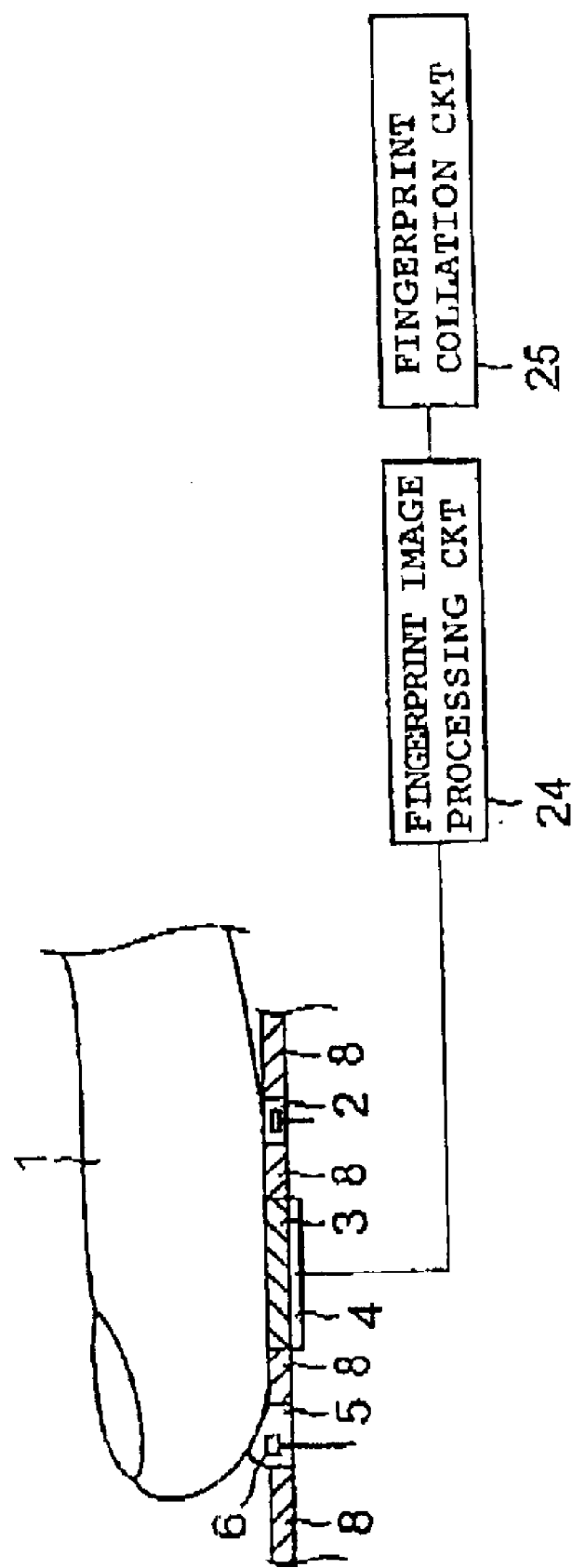
FIG. 17 is a schematic view of a fingerprint input apparatus according to a sixth embodiment of this invention.

Referring to FIG. 17, a fingerprint input apparatus according to a sixth embodiment will be described. The protruding portion 5 is provided with an additional light source (such as an LED chip) 6. Light emitted from the additional light source 6 passes through the protruding portion 5.

Figure 16:
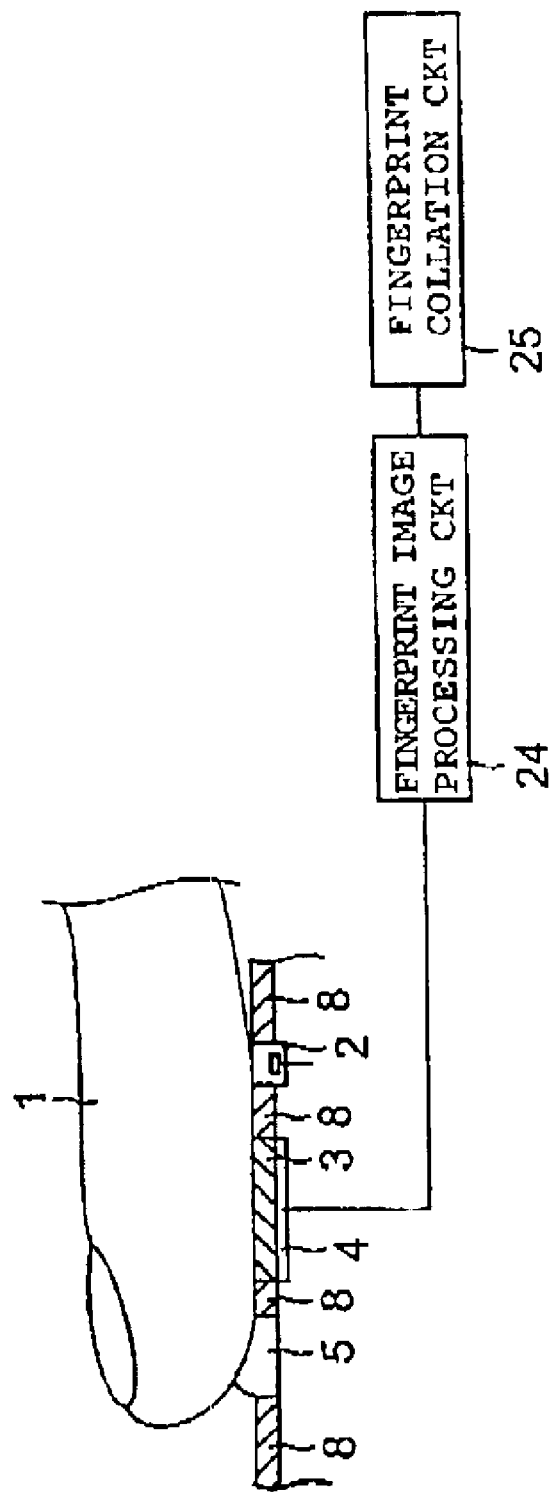
FIG. 16 is a schematic view of a fingerprint input apparatus according to a fifth embodiment of this invention.

Thus, as illustrated in FIGS. 16 and 17, the protruding portion 5 is formed as a guide for positioning the finger 1 to perform fingerprint measurement. The guide (protruding portion 5) is light-transmissible and has a generally triangular section. Only an upper surface to be touched with the finger 1 has a shape fitted to the curve of the finger 1 so that no uncomfortable feeling is caused when the finger is touched. Because of presence of the guide (protruding portion 5), a finger contact area is increased so that illuminating light emitted through the guide (protrusion 5) is guided to the finger 1 in a greater quantity. Since the section of the guide (protrusion 5) is generally triangular, the light reflected at the other side (surface) opposite to the side faced to the finger 1 advances towards the finger 1. At a boundary between the finger 1 and the upper surface touched with the finger 1, there is a little difference in refractive index between the material of the guide (protrusion 5) and the skin of the finger 1. Therefore, the light is almost entirely transmitted into the finger 1. In case where the finger 1 is a small finger of, for example, a child, the finger 1 does not touch the guide (protrusion 5) and the above-mentioned optical mechanism does not work. However, lateral components of the light emitted from the guide (protrusion 5) are irradiated to lateral sides of the finger 1 and injected into the finger 1. Without the guide (protrusion 5), the above-mentioned components of the light are not substantially utilized.

Figure 18:
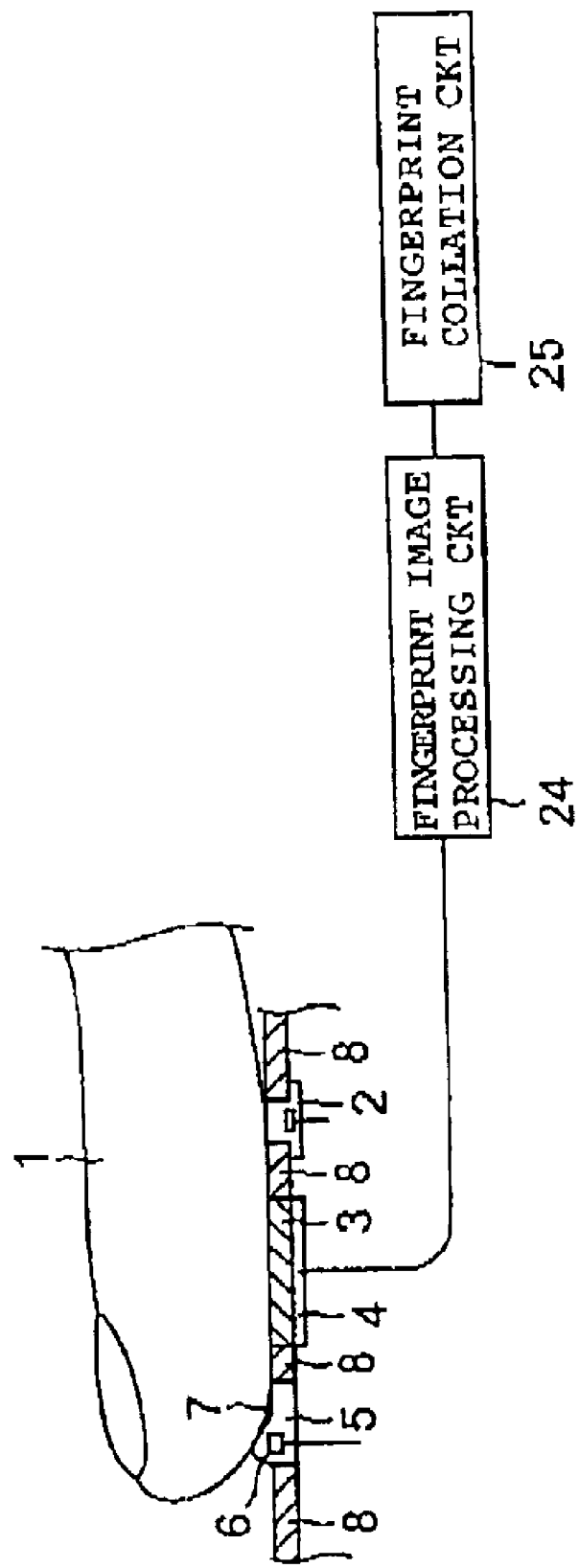
FIG. 18 is a schematic view of a fingerprint input apparatus according to a seventh embodiment of this invention.

(4) Referring to FIG. 18, a fingerprint input apparatus according to a seventh embodiment of this invention will be described. The guide (protrusion 5) has a slant surface which is defined by the one side of the section faced to the finger 1 and which is adapted to be fitted to the finger 1. The slant surface has a light shielding portion 7 formed in a first half region near the base of the finger 1. The light from the additional light source 6 is irradiated towards the finger 1 from a second half region of the slant surface near the fingertip of the finger 1.

The guide (protrusion 5) is positioned in close proximity of the measured surface. Therefore, the light from the guide (protrusion 5) may be incident to the measured surface to cause optical crosstalk. In addition, in case where the light is introduced into the finger 1 from a position at a very small distance from the measured surface, nonuniformity in light quantity is increased. In view of the above, a part very close to the measured surface is covered with a light shielding material to form the light shielding portion 7 so that the crosstalk and the nonuniformity in light quantity are suppressed.

(5) In the first (FIG. 10), the second (FIG. 12), the fifth (FIG. 16), the sixth (FIG. 17), and the seventh (FIG. 18) embodiments of this invention, the light source 2 produces near-infrared light having a wavelength between 82 and 980 nm. In case where the light source 2 is the near-infrared light source, light attenuation in the finger 1 is small so that a clear image is obtained even with low electric power. This allows a greater distance between the light source 2 and the measured portion so that the nonuniformity in light quantity can be reduced.

(6) In the first embodiment (FIG. 10), the light source 2 comprises an LED 2a as a light emitting element chip for emitting the light, and a package 2b made of a light transmitting plastic material and enveloping the LED 2a. The light transmitting plastic material has a refractive index not greater than 1.8 which is a refractive index of the skin of the finger 1.

Figure 19:
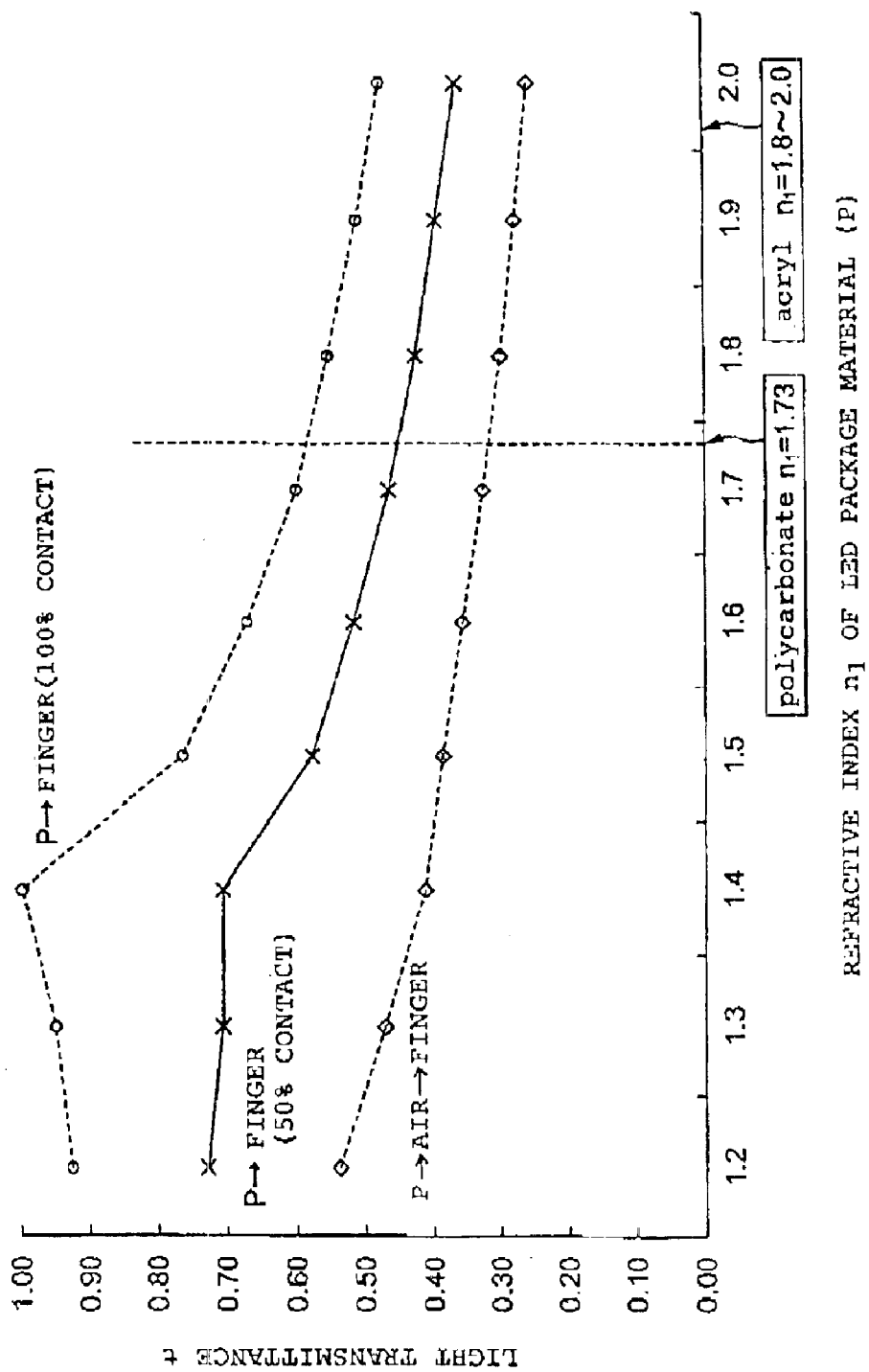
FIG. 19 is a view showing the relationship between a refractive index of a LED package material (P) and a light transmittance when a LED package is contacted with a finger (P→finger (100% contact))

Thus, the package 2b of the LED 2a is substantially a transparent plastic material. Generally, no attention is paid to the refractive index of the plastic material. However, in the fingerprint input apparatus operated with low electric power, it is necessary to increase the light transmittance to the finger even slightly. Therefore, the refractive index of the plastic material is desired to be as close as possible to the refractive index (1.8) of the skin of the finger. However, in a range smaller than the refractive index of the finger, decrease in transmittance is not remarkable. As a desired range which can be realized, the refractive index (P) of the LED package material is not greater than 1.5. In this event, the optical loss is suppressed to 20% or less (light transmittance being 0.80 or more), as shown in FIG. 19 (see P→finger (100% contact) in FIG. 19). In case where the light from the LED once comes out from the package to the air and thereafter enters into the finger (P→air→finger), the transmittance upon advancing from the package to the air is small. Therefore, as illustrated in FIG. 19, when the refractive index (P) of the LED package material is equal to 1.5, the optical loss is 60% or more.

Figure 20A:
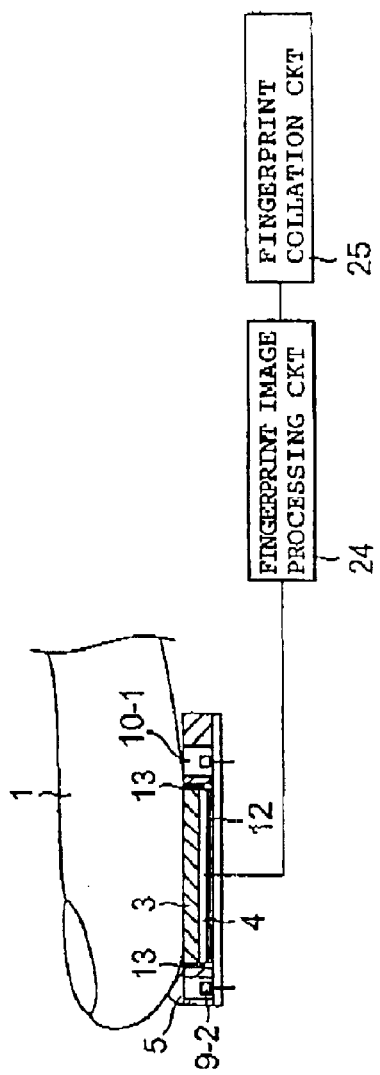
FIGS. 20A and 20B are a schematic view and a plan view of a fingerprint input apparatus according to an eighth embodiment of this invention.
Figure 20B:
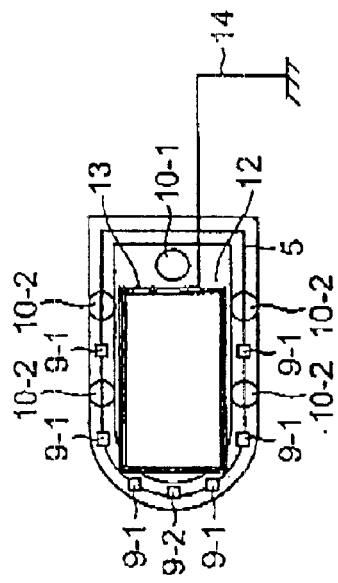

Referring to FIGS. 20A and 20B, description will be made of a fingerprint input apparatus according to an eighth embodiment of this invention utilizing the above-mentioned techniques (1) to (6).

Referring to FIGS. 20A and 20B, the finger 1 is pressed along the guide 5 against the fiber optic plate 3 in which the optical fibers are arranged with their axes inclined. Simultaneously, the finger 1 is placed so that the first joint of the finger 1 to be subjected to fingerprint measurement is contacted with a near-infrared light source 10-1 (corresponding to the light source 2 in FIG. 10 etc.). At a position faced to the fingertip, a red (or green) LED 9-2 is disposed to serve as a pilot lamp and a finger position guide. With the LED 9-2 used as an indicator, the finger 1 is placed. Then, the finger 1 touches the guide (protrusion 5). Therefore, even in a dark place, the finger 1 can be placed at a proper position. Since the near-infrared light source 10-1 has a flat upper surface, the light source 10-1 can be pressed against the first joint of the finger 1 over a wider area. In addition, a plurality of near-infrared light sources 10-2 for irradiating light from the lateral sides of the finger 1 are arranged at four positions in total on left and right sides. The light sources 10-2 irradiate near-infrared light obliquely from the lower sides to the lateral sides of the finger 1 through the finger position guide (protrusion 5) made of a light transmitting material. Thus, the light quantity on the left and the right sides of the measured portion is satisfied. For illumination of an end portion of the measured surface, the light quantity is supplemented by four red LEDs 9-1 arranged at an end portion of the measuring surface of the apparatus to serve as an indicator of the position of the finger 1 and an auxiliary light source for measurement.

In the above-mentioned manner, the guiding light sources 9-1 and 9-2 for producing the light for guiding the finger 1 to the proper position are disposed around the fiber optic plate 3.

In the embodiment illustrated in FIGS. 20A and 20B, the peripheral end face of the fiber optic plate 3 is surrounded by a metal frame as the electroconductive substance 13. The metal frame is grounded. The metal frame in this embodiment has an end face flush with the surface of the fiber optic plate 3 so as to avoid an uncomfortable feeling when the finger 1 is contacted. At a first glance, it seems that the contact with the finger 1 is not sufficient. However, because the metal has an excellent conductivity and the fiber optic plate 3 has an excellent insulation, electric charges accumulated in the finger 1 are discharged towards the metal frame when the finger approaches thereto.

The effect of this invention is as follows. In the fingerprint input apparatus, the fiber optic plate, the two-dimensional sensor, and the finger guide are received in a thin space of about 2 mm on a single plane and in an area adjacent to the measured surface of the finger. Thus, the fingerprint input apparatus has a compact structure and is yet resistant against the electrostatic charges and the external disturbance light. In addition, the small finger of a child or the like can be measured also. Thus, this invention is adapted to a wide range of applications. The optical fiber axis of the fiber optic plate used in the apparatus has an optimum inclination angle within a relatively narrow range between 45° and 60°. Therefore, the resolution in the longitudinal direction is not sacrificed. By the use of the near-infrared LED of a high efficiency, electric power for lighting the LED is saved so that the fingerprint input apparatus is suitable for a miniaturized mobile telephone apparatus. In addition, the finger guide in FIGS. 20A and 20B is made of a transparent or a semitransparent resin and has a refractive index of about 1.4 to 1.8 which is relatively close to the refractive index of the skin of the finger. The light in the guide is introduced into the finger at an efficiency of 40% or more. As compared with the case where the light passes through the air, the light is more effectively used by 30% or more (FIG. 19). The electric power for lighting is reduced correspondingly. The LED arranged in the vicinity of the first joint and having a flat top surface allows smooth touch of the finger. Therefore, the apparatus can be used with comfortable feeling and the stability of measurement is not degraded.

Figure 2A:
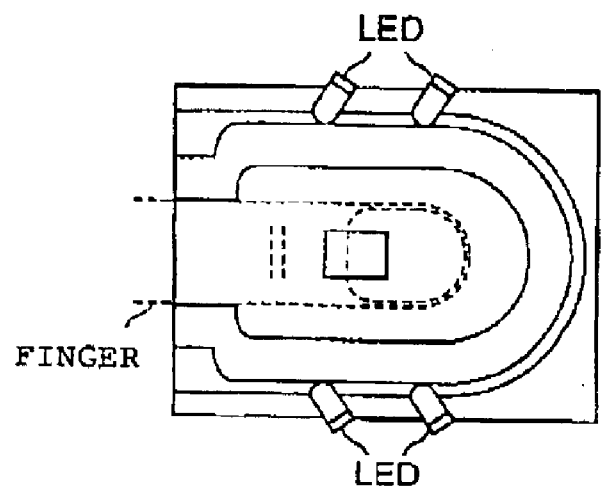
FIGS. 2A and 2B are a plan view and a sectional view for describing an existing technique of irradiating light from a lateral side of a finger.
Figure 2B:
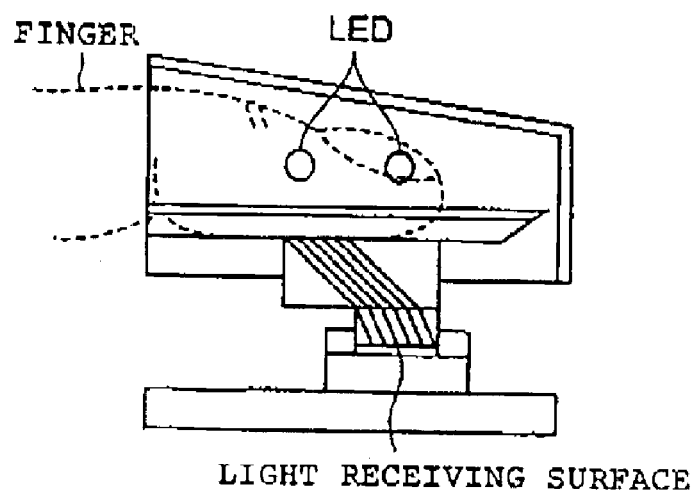
Figure 3:
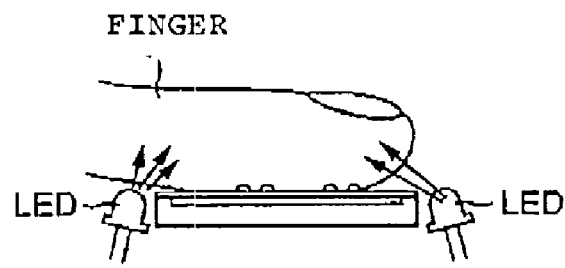
FIG. 3 is a view for describing an existing technique of irradiating light from a lower side of a finger.
Figure 4:
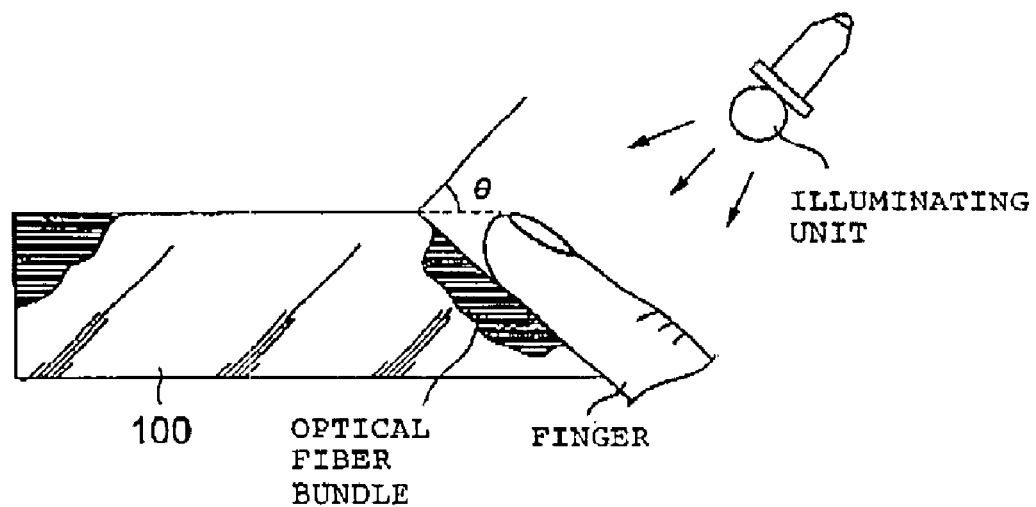
FIG. 4 is a view for describing another existing technique.
Figure 5:
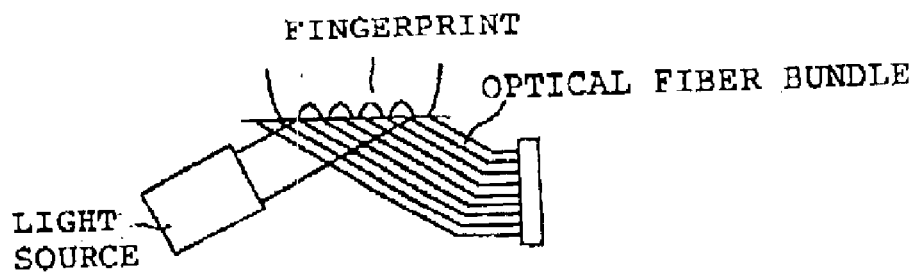
FIG. 5 is a view for describing still another existing technique.
Figure 6:
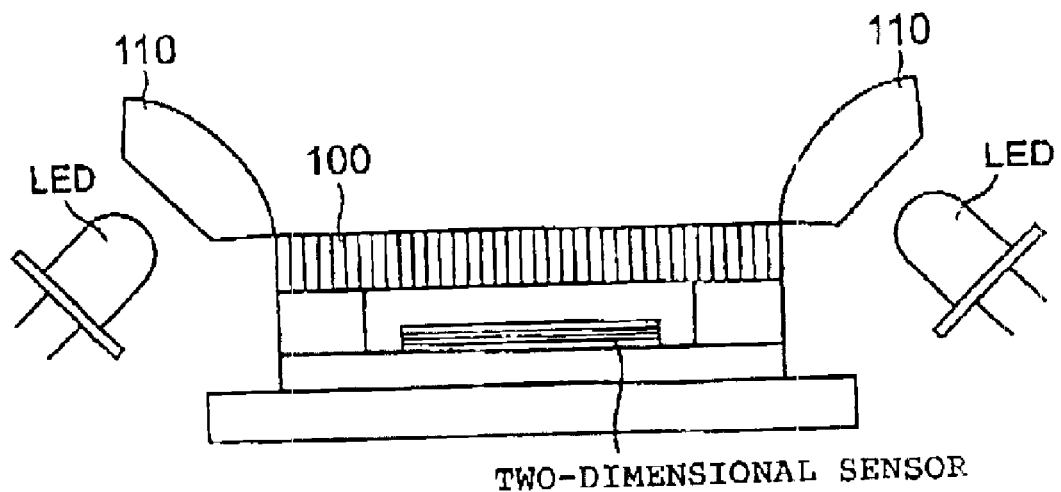
FIG. 6 is a view for describing yet another existing technique.
Figure 7A:
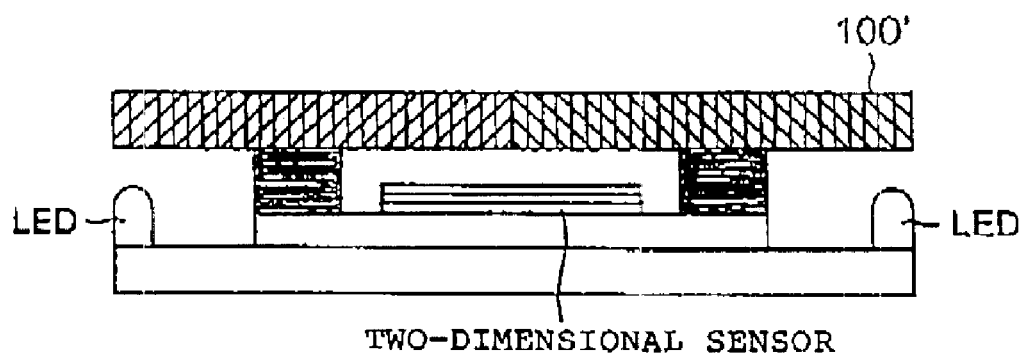
FIGS. 7A and 7B are a schematic view of an existing fingerprint input apparatus and a perspective view of a fiber optic plate used therein, respectively.
Figure 7B:
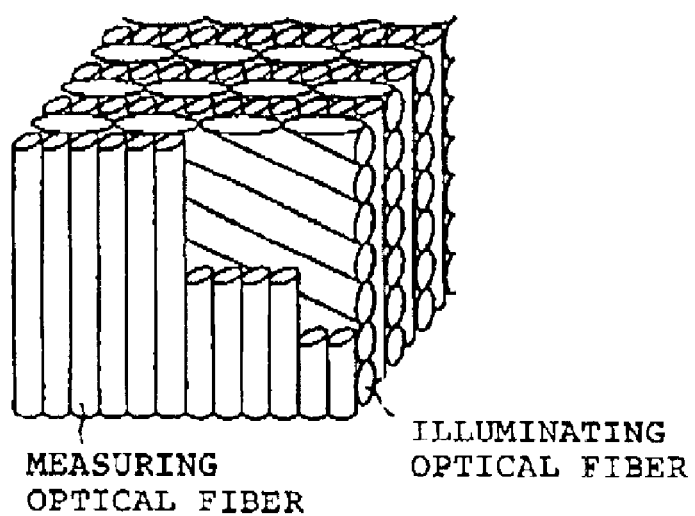
Figure 8A:
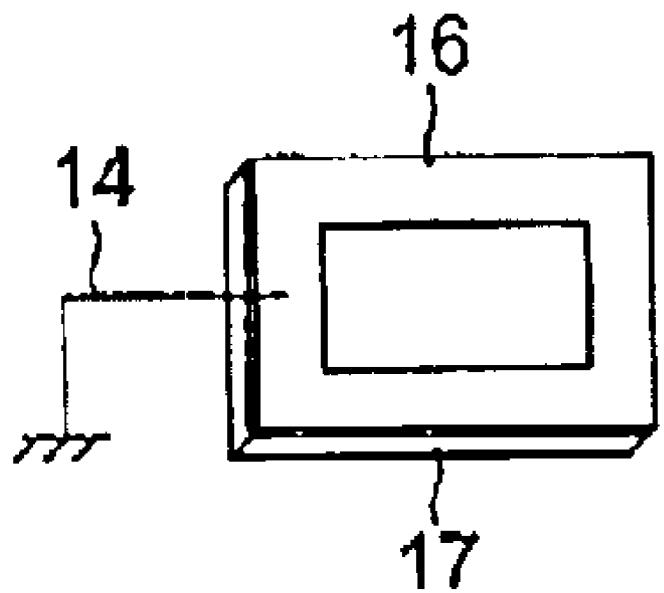
FIGS. 8A and 8B are a perspective view and a sectional view of an existing static capacitive sensor.
Figure 8B:
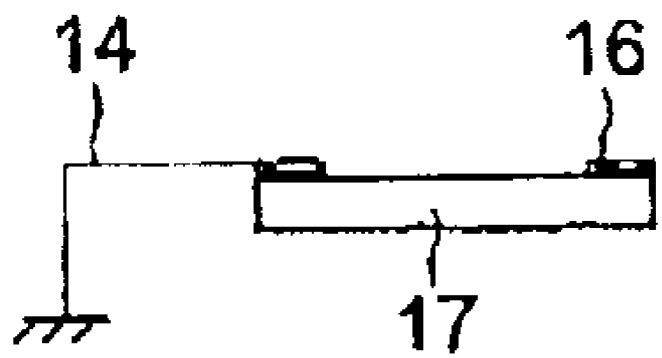
Figure 21:
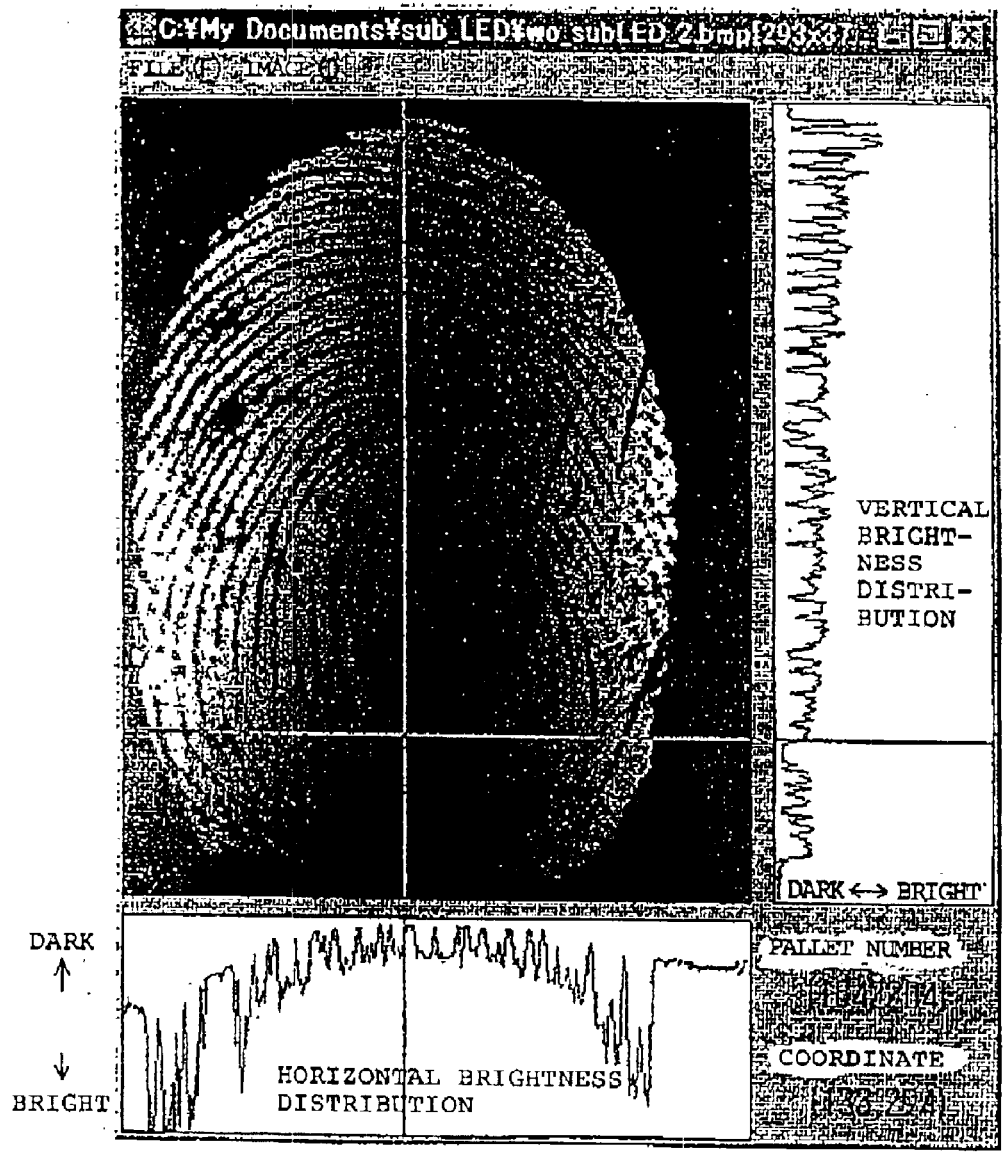
FIG. 21 is a view showing the brightness distribution of a fingerprint image read by a two-dimensional image sensor of the fingerprint input apparatus without an LED below a first joint.

In addition to the practical effect mentioned above, this invention has the following essential effect. In case where the light source 2 in FIG. 10 (or the near-infrared light source 10-1 in FIGS. 20A and 20B) is used, the fingerprint image shown in FIG. 11 is obtained. Without the above-mentioned light source, a fingerprint image shown in FIG. 21 is obtained. At first, an illuminating method used in case of FIG. 21 will be described. Two light sources are arranged on each of the left and the right sides of the measured surface of the finger to inject light into the finger. Most of the existing illuminating methods adopt the above-mentioned arrangement. One example is illustrated in FIGS. 2A and 2B. In this case, the fingerprint image is particularly dark in a lower center area. In the fingerprint image in FIG. 21, the lower center area seems to lose the contrast. The fingerprint image is read by the two-dimensional sensor. In FIG. 21, the longitudinal brightness distribution is shown on the right side of the fingerprint image while the transversal brightness distribution is shown below the fingerprint image. The longitudinal brightness distribution at the center has a contrast which is small as a whole and is further reduced towards the base of the finger. The transversal brightness distribution has a contrast which is not sufficient over a wide range around the center. In case where the conditions such as the contact by the finger and the dryness of the finger are not good, the measurement is unstable. In this event, malfunction will be caused or, in the worst case, the measurement is impossible. In order to compensate the insufficient contrast mentioned above, the amount of calculation is considerably increased. This results in disadvantages, such as an increase in power consumption and an increase in total cost.

On the other hand, by the use of the light source 2 in FIG. 10 (or the near-infrared light source 10-1 in FIGS. 20A and 20B), the light quantity is increased in the center area in the longitudinal direction, particularly on the lower side. Therefore, the nonuniformity of contrast is reduced as a whole so that the fingerprint image shown in FIG. 11 is obtained. In particular, the contrast in the transversal direction is strong and uniform as a whole. Each of the fibers of the fiber optic plate is inclined towards the first joint of the finger. Therefore, sensitivity is high for the light from the light source 10-1. This compensates the insufficiency in light quantity in the longitudinal center area of the finger and exhibits the effect of equalizing the light quantity throughout the measured surface. The fiber optic plate is provided with the metal part formed throughout the entirety of the peripheral end face and grounded. In case where the electrostatic charges accumulated in the finger have very strong electric energy, air discharge occurs to the metal part so as to prevent destruction of the measuring portion or disturbance of characteristics. If the finger is contacted with the metal part, the electrostatic charges are instantaneously discharged completely so as to prevent the destruction of the sensor or the malfunction due to the electrostatic charges upon measurement of the fingerprint. The surface of the sensor is protected by the fibers which serve as an excellent insulating material. Even if the finger touches the fibers, discharge is not directed towards the sensor but towards the metal part therearound.

As described above, according to this invention, the fingerprint input apparatus of an optical transmissive type is obtained in which the light source is disposed so that the light from the light source enters into the substantial center of the part of the finger including the first joint on the palm side and that the light source is contacted with the finger. With this structure, the fingerprint input apparatus of an optical transmissive type can be reduced in size.

What is claimed is:

1. A fingerprint input apparatus comprising a light source (2) for emitting light and a plate (3) having a finger contact surface with which a finger (1) is brought into contact in order to pick up a fingerprint image of said finger, said fingerprint image being obtained by introducing the light from said light source into an inside of the finger to scatter the light within the inside of said finger, and collecting the light coming out of said finger through a surface of said finger to form the fingerprint image, wherein:

said light source is arranged so that the light from said light source enters into a substantial center of a part of said finger which part includes a first joint on a palm side of said finger and that said light source is adapted to be brought into contact with said finger.

2. A fingerprint input apparatus as claimed in claim 1, wherein:

said part including said first joint on the palm side of said finger is a region between a line nearer to a fingertip of said finger than said first joint by 10 mm and a different line farther from said fingertip than said first joint by 10 mm on the palm side of said finger.

3. A fingerprint input apparatus as claimed in claim 1, wherein:

said plate is a fiber optic plate (3) comprising a bundle of a plurality of optical fibers.

4. A fingerprint input apparatus as claimed in claim 3, wherein:

each of the optical fibers of said fiber optic plate has a fiber axis inclined towards a base of said finger at a predetermined inclination angle with respect to a normal line to the finger contact surface of said plate, the inclination angle falling within a range between 45° and 60° with respect to said normal line.

5. A fingerprint input apparatus as claimed in claim 3, wherein:

said fiber optic plate has a peripheral end face surrounded by an electroconductive substance (13) which is grounded.

6. A fingerprint input apparatus as claimed in claim 5, wherein:

the electroconductive substance is shaped to climb up onto an end portion (15) of the finger contact surface of said fiber optic plate.

7. A fingerprint input apparatus as claimed in claim 5, wherein:

said electroconductive substance is a light-shielding substance.

8. A fingerprint input apparatus as claimed in claim 1, wherein:

the finger contact surface of said fiber optic plate has a protruding portion (5) which serves to position said finger and which has a shape such that a fingertip of said finger is surrounded by said protruding portion except said part including said first joint, said protruding portion having a section such that one side faced to said finger extends along said finger.

9. A fingerprint input apparatus as claimed in claim 8, further comprising:

an additional light source (6) located in said protruding portion, said protruding portion transmitting light from said additional light source.

10. A fingerprint input apparatus as claimed in claim 9, wherein:

said protruding portion has a slant surface which is defined by the one side of the section faced to the finger and which is adapted to be fitted to the finger, the slant surface having a light shielding portion (7) formed in a first half region near the base of the finger, the light from said additional light source being irradiated towards the finger from a second half region of the slant surface near the fingertip of the finger.

11. A fingerprint input apparatus as claimed in claim 1, wherein:

said light source is adapted to emit near infrared light having a wavelength between 820 and 980 nm.

12. A fingerprint input apparatus as claimed in claim 1 wherein:

said light source comprises a light emitting element chip (2a) for emitting the light and a package (2b) made of a light transmitting plastic material and enveloping said light emitting element chip;

said light transmitting plastic material having a refractive index not greater than 1.8 which is a refractive index of a skin of the finger.

13. A fingerprint input apparatus as claimed in claim 1, wherein:

said plate is provided with a guiding light source (9-1, 9-2) located at its periphery for emitting light to guide the finger to a proper position.

* * * * *